United States Patent [19]
Grindahl et al.

[11] Patent Number: 5,212,714
[45] Date of Patent: May 18, 1993

[54] HIGH SPEED DATA INTERFACE FOR LAND MOBILE COMMUNICATION SYSTEM

[75] Inventors: Mervin L. Grindahl; Philip M. Wala, both of Waseca, Minn.

[73] Assignee: E. F. Johnson Company, Waseca, Minn.

[21] Appl. No.: 355,089

[22] Filed: May 18, 1989

Related U.S. Application Data

[63] Continuation of Ser. No. 192,846, May 11, 1988, abandoned.

[51] Int. Cl.⁵ .................................... H04L 25/00
[52] U.S. Cl. .................................... 375/5; 375/121
[58] Field of Search .............. 375/5, 25, 100, 121; 455/38, 54; 340/825.44; 370/110.1

[56] References Cited

U.S. PATENT DOCUMENTS

| | | | |
|---|---|---|---|
| 3,281,789 | 10/1966 | Willcox | 375/5 |
| 4,131,849 | 12/1978 | Freeburg et al. | 375/5 |
| 4,152,647 | 5/1979 | Gradden et al. | 455/54 |
| 4,271,509 | 6/1981 | Brolin | 370/110.1 |
| 4,377,860 | 3/1983 | Godbole | 375/25 |
| 4,430,742 | 2/1984 | Milleker et al. | 455/38 |
| 4,471,489 | 9/1984 | Konetski et al. | 375/5 |
| 4,481,489 | 11/1984 | Kurby | 375/5 |
| 4,581,746 | 4/1986 | Arnold | 375/5 |
| 4,621,368 | 11/1986 | Onoe et al. | 375/100 |

*Primary Examiner*—Stephen Chin
*Attorney, Agent, or Firm*—Patterson & Keough

[57] ABSTRACT

A high speed data interface unit that is fully compatible with existing, trunked, land mobile voice transceivers is provided. Data rates of up to 4800 baud using bilevel modulation are achievable without the use of dedicated data transceivers, or the designation of a dedicated data channel. The data interface includes a microprocessor based modem having data pulse formation, data recovery, and pulse filtering circuits that optimize available channel bandwidth for communication of digital data.

8 Claims, 8 Drawing Sheets

HIGH SPEED DATA INTERFACE FOR LAND MOBILE COMMUNICATION SYSTEM

This application is a continuation of application Ser. No. 07/192,846 filed on May 11, 1988 now abandoned.

TECHNICAL FIELD

This invention pertains to land mobile radio communication systems. In particular, it pertains to a data interface enabling the high speed transmission of data over existing land mobile voice communication facilities.

BACKGROUND ART

Land mobile radio systems provide for two way radio communications between a central control station and a fleet of cars, trucks, or other land based vehicles. Typical users of land mobile radio systems include police departments, fire departments, taxi services and delivery services. A land mobile system can be configured for communications between the control station and all vehicles in a fleet, between the control station and selected vehicles in the fleet, or between different individual vehicles within a fleet.

Conventional land mobile radio systems are typically organized with a number of vehicles and a control station assigned to a single channel. A user assigned to the common channel must wait until no one else is transmitting on the channel before sending a message, since only one transmission at a time can be processed by a single channel. Even when a transmission is addressed to only one user in a conventional system (and therefore not heard by the other users), the other users in the system must wait until the transmission is completed before they can use the system to communicate.

Trunked land mobile radio systems are an improvement over conventional land mobile radio systems in that trunked systems enable two or more users of the system to transmit at the same time. For instance, the control station in a trunked system can be communicating with one of the vehicles in the fleet, while, at the same time, two other vehicles in the fleet can be using the same trunked system to communicate with each other. Trunked systems group a number of channels into a single system, with each channel accessible to each user of the system. Switching protocol automatically finds and engages an open channel when a user initiates a transmission, avoiding channels that are already in use at the time the transmission is initiated. Since each user will only need to communicate over the system part of the time, and because it is unlikely that all users will need to communicate at precisely the same time, the number of channels assigned to a trunked group can always be less than the number of users assigned to the trunked system.

The United States Federal Communications Commission (FCC) has assigned 600 channels in the 800 MHz band for trunked land mobile use. In particular, mobile transmit frequencies are 806-821 MHz, with the repeater transmit frequencies exactly 45 MHz above the mobile transmit frequencies, or 851-866 MHz. Channel spacing is 25 kHz, with the maximum allowed deviation being +/−5 KHz.

Land mobile radio systems have proven to be an economical and effective means for establishing voice communications between a control station and a fleet of mobile vehicles. The capability of land mobile radio systems to transmit data, however, has heretofore been severely limited by both environmental factors and equipment limitations. The high frequency of land mobile channels, and the mobile nature of vehicle based transceivers, for instance, both contribute to multipath fading of land mobile transmission signals. Multipath fading is particularly hostile to the reliable reception of data signals. Strict limitations on transmitter power levels to prevent interchannel interference exascerbates the fading problem.

Equipment limitations present further problems for accurate and timely transmission of data signals over existing land mobile radio systems. Audio filters in voice radio equipment typically restrict available bandwidth to about 3000 HZ. While it would be desirable to use currently existing land mobile voice transceivers for transmission of data, the built-in bandwidth restrictions set by voice transceiver audio band filters inherently limits bilevel data transmission rates to below 1500 baud. Moreover, preferred trunked radio systems use the subaudio band for transmission of system signaling data, further restricting the bandwidth available for transmitting data information.

Various schemes have been attempted for transmitting data over land mobile radio systems. Frequency shift keying (FSK) modulation techniques have been used to transmit data over land mobile voice transceivers. Use of FSK modulation techniques in a voice transceiver, however, restricts transmission rates to under 1500 baud when encoding the data in preferred, bilevel modulation schemes. Higher transmission rates can be obtained using multilevel FSK modulation techniques, but reliability of multilevel FSK modulation, particularly in the high 800 MHz band, is generally unacceptable. Data can be sent at higher rates than that available through FSK modulation by use of dedicated data transceivers. Using dedicated data transceivers, however, increases initial cost of a system, as well as increasing maintenance costs. Furthermore, dedicated data transceivers require assignment of a dedicated data transmission channel, and are therefore incompatible with trunked systems.

A data interface that achieved high speed, reliable data transmission in a land mobile, trunked voice radio system, would be a decided advantage.

SUMMARY OF THE INVENTION

The present invention provides a data interface that is fully compatable with existing, trunked, land mobile voice transceivers. Data rates of up to 4800 baud using bilevel modulation are achievable without the use of dedicated data transceivers, or the designation of a dedicated data channel.

The data interface hereof includes a microprocesser based modem with its own data pulse formation and data recovery circuits. A software based protocol selectively couples the data interface with the voice transceiver for the alternate communication of voice and data signals.

The data interface continually monitors the unfiltered audio input from the transceiver detector, processing the audio input through its own filtering network. A data recovery circuit demodulates bilevel Manchester encoded data from the audio input to provide an onboard microprocessor with NRZ formated data and a recovered clock signal. Upon recognition of a predetermined dotting pattern in the recovered data signal, the data interface microprocessor disables the transceiver for voice transmission and reception, and presents the recovered data to the data terminal through a standard RS-232 connector.

In the transmit mode, the data interface receives NRZ data from the data terminal, and stores the data until the transceiver is available for data transmission. The NRZ formatted data received from the terminal is transformed into Manchester encoded data, and presented to the transceiver for transmission.

BRIEF DESCRIPTION OF THE DRAWINGS

FIG. 2 FIGS. 2A-2F are schematic diagram of the high speed data interface in accordance with the present invention.

DETAILED DESCRIPTION OF THE DRAWINGS

Figure 1:
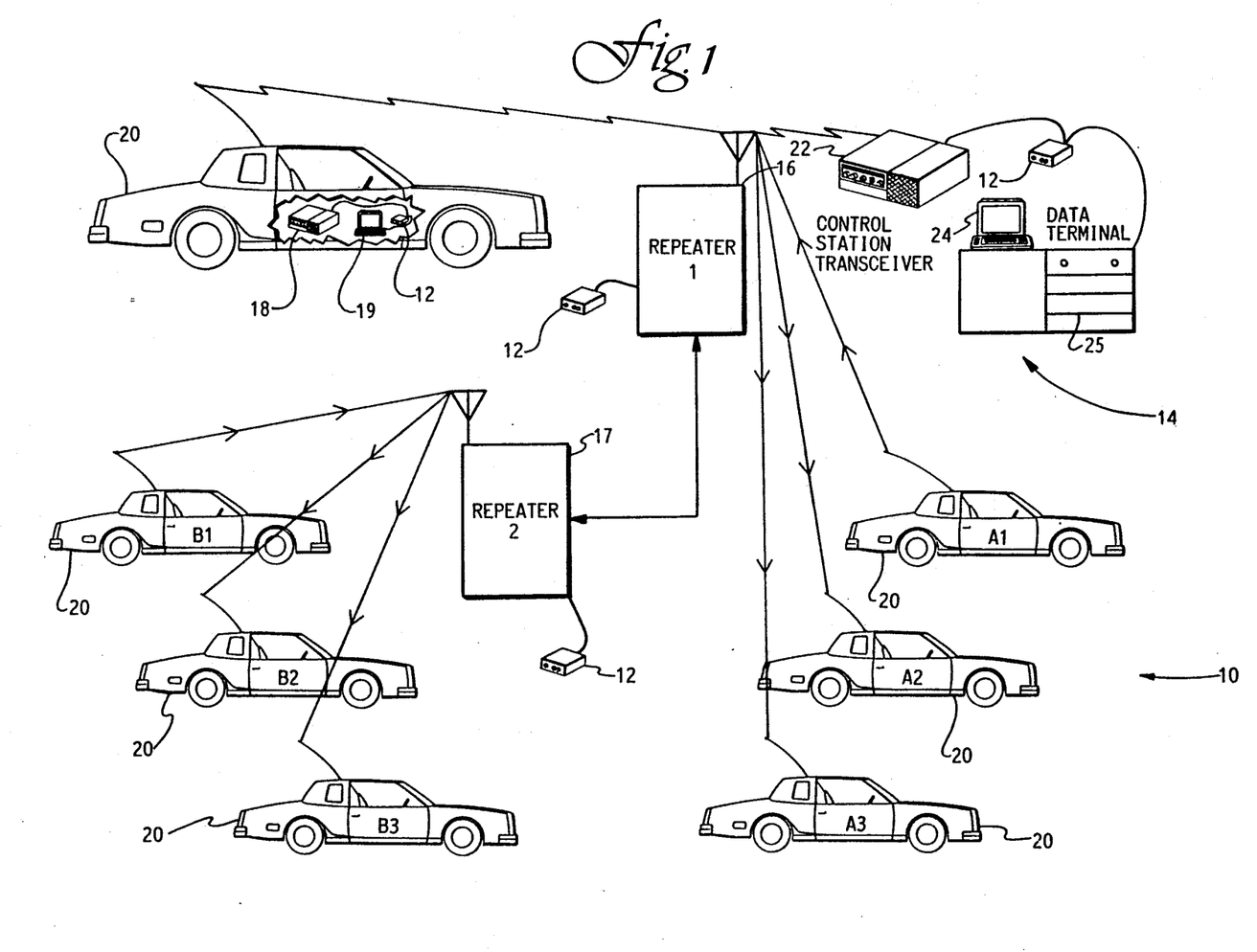
FIG. 1 is a schematic depiction of a land mobile communication system.

Referring to the drawings, a typical trunked land mobile radio system 10, configured with a plurality of data interface units 12 in accordance with the present invention, is depicted in FIG. 1. The system includes a control station 14, a plurality of radio repeaters 16, 17, and a plurality of mobile voice radio transceivers 18 and associated mobile data terminals 19 installed in a fleet of mobile vehicles 20. While only one vehicle is enlarged in FIG. 1 to show the transceiver 18 and terminal 19, it will be understood that each vehicle 20 is so equipped. The radio system 10 can be selectively configured to accommodate any combination of two way transmission paths, such as control station to an individual mobile vehicle, control station to all mobile vehicles, or mobile vehicle to mobile vehicle. A data interface 12 is associated with each repeater 16, 17, the control station 14, and each mobile transceiver 18. The control station 14 is equipped with a control station transceiver 22, a computer terminal 24 and a computer 25.

Figure 2:
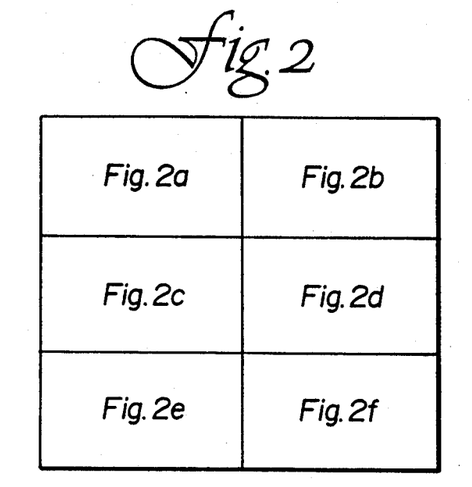
Figure 2A:
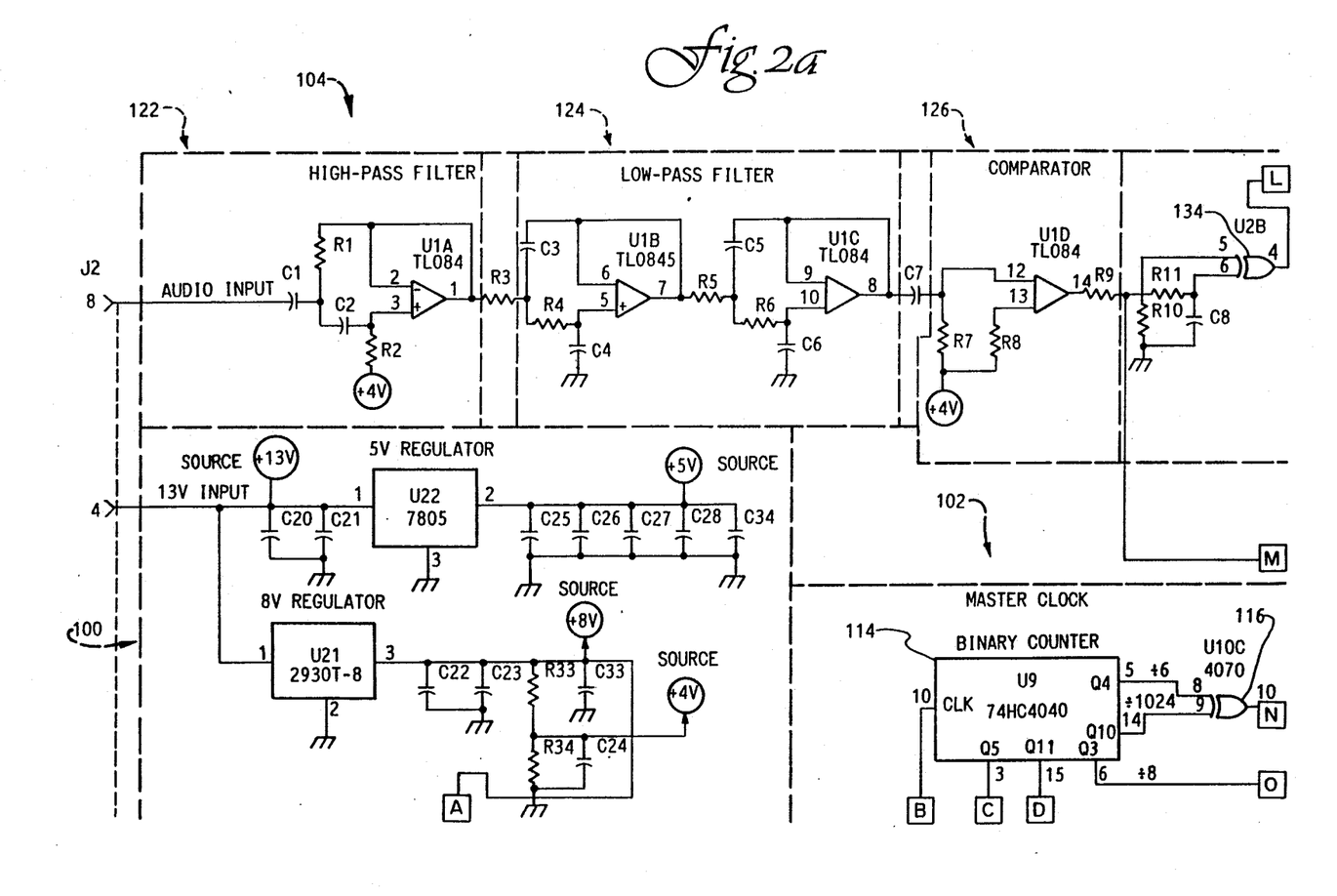
Figure 2B:
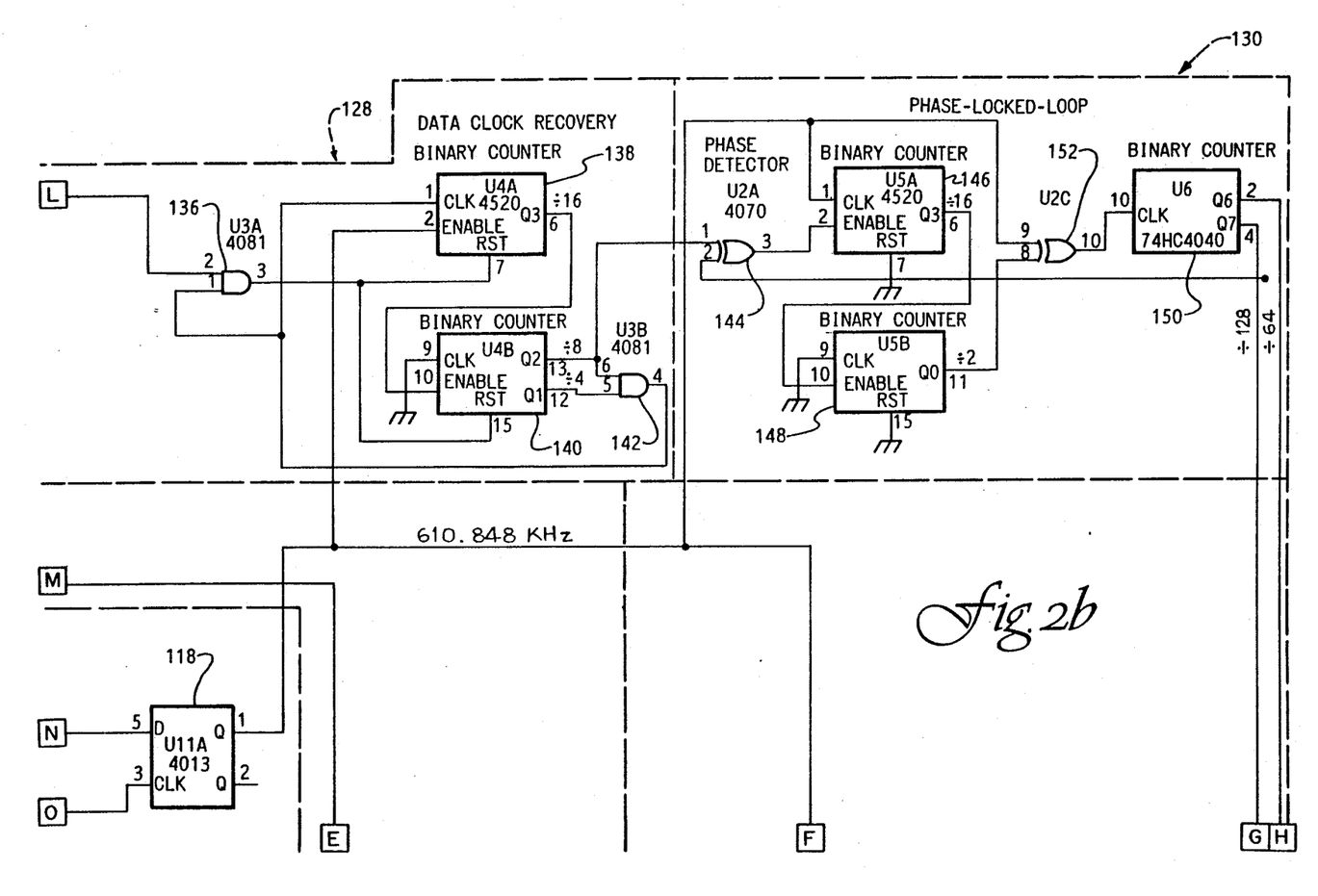
Figure 2C:
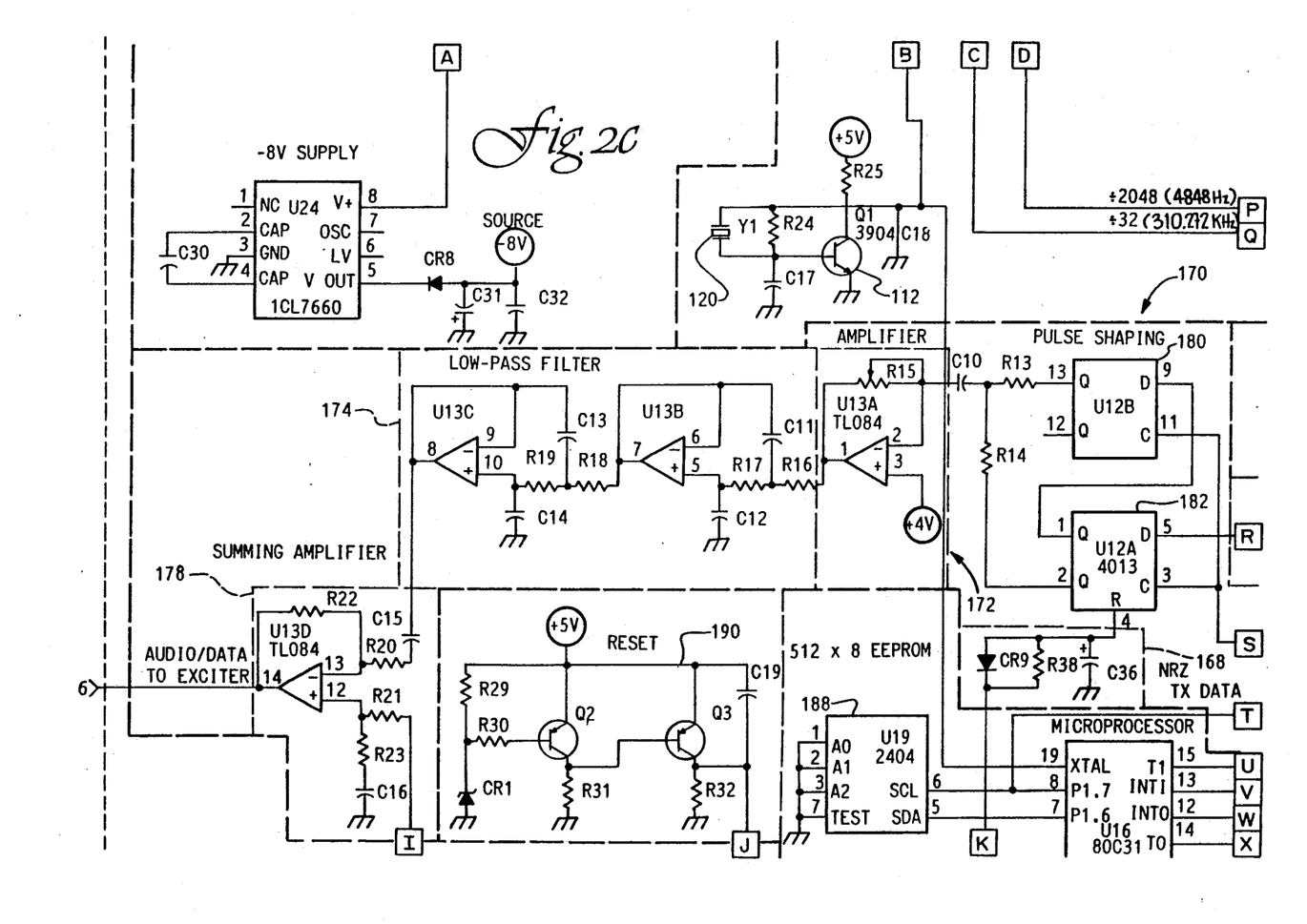
Figure 2D:
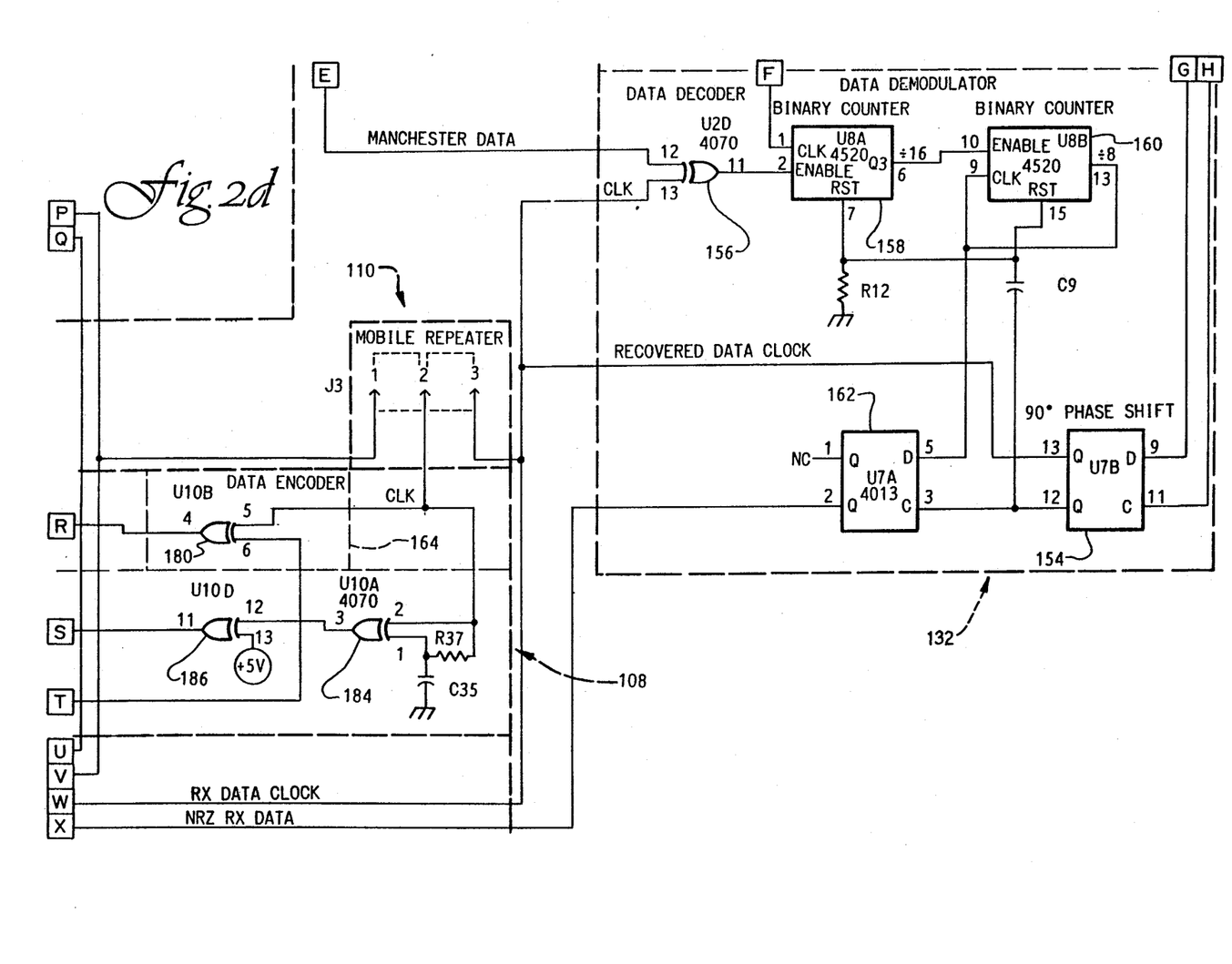
Figure 2F:
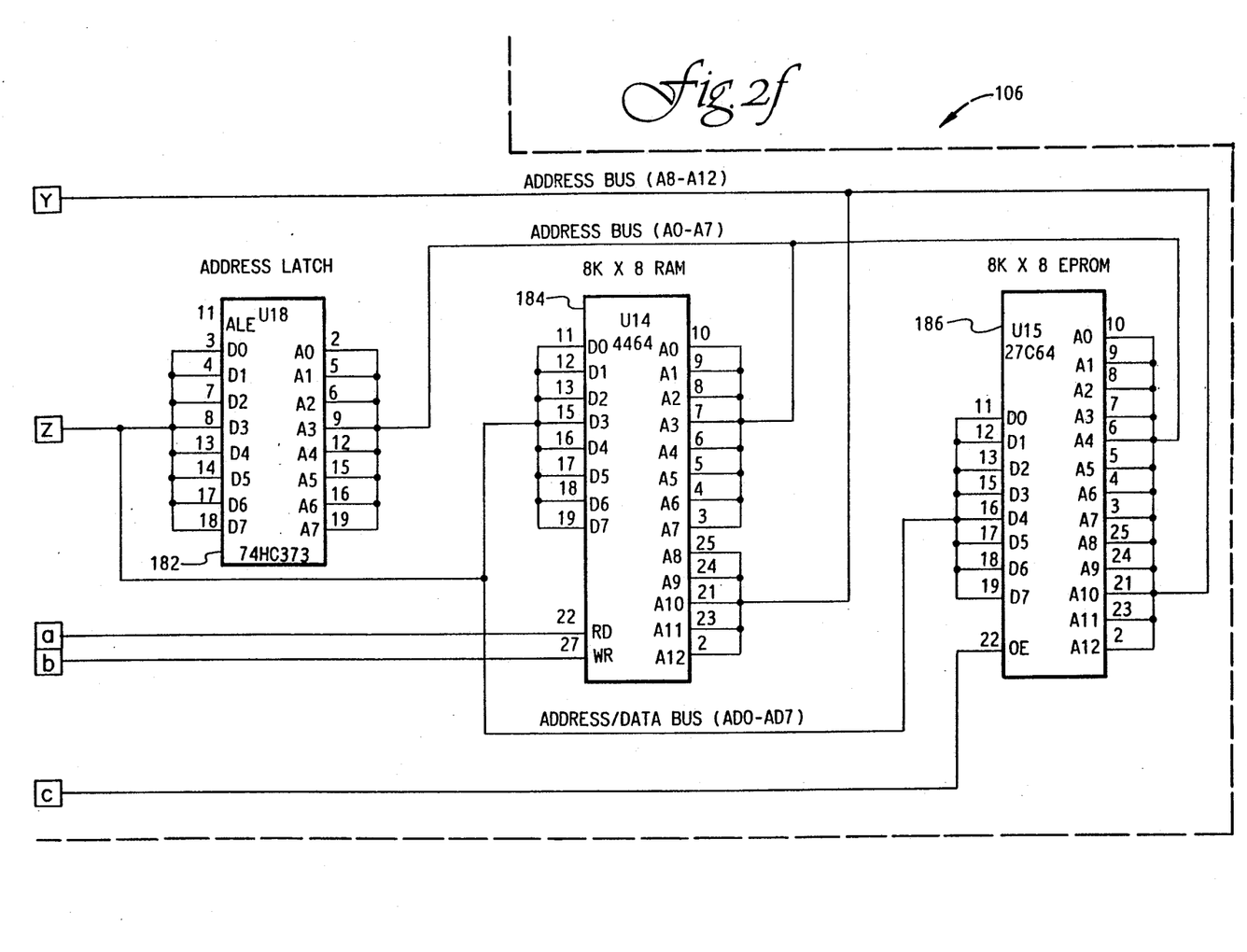

A schematic diagram of a preferred embodiment of a data interface unit 12 in accordance with the present invention is depicted in FIG. 2. The data interface unit 12 broadly includes power supply 100, master clock 102, data receiving and decoding circuitry 104, logic unit 106, data encoding circuitry 108, and mobile/repeater adapter switch 110. The data interface unit 12 is connected to an associated data terminal via RS-232 connector 111. The remaining input/output lines depicted on the left side of FIG. 2 connect the data interface unit 12 to its associated transceiver, as will be discussed in detail below.

The power supply 100 operates off of a 13 volt DC supply received from the transceiver 18 (in the mobile configuration), transceiver 22 (in the control station configuration) or repeater 16, 17 (in the repeater installation) associated with the data interface unit 12. The output of the power supply 100 includes 13 volt, 8 volt, 5 volt, 4 volt, and −8 volt levels of regulated DC power for powering the various circuits within the data interface unit 12.

Master clock 102 includes oscillator 112, binary counter 114, exclusive or gate 116, and flip-flop 118. The frequency of oscillator 112 is set by crystal 120 to provide a 9.9287 MHz signal to the XTAL input of the logic unit 106 microprocessor, and the clock input (pin 10) of binary counter 114. Binary counter 114 divides the 9.9287 MHz signal to provide 4848 Hz and 310.272 KHz outputs at pin 3 and pin 15 of the binary counter 114. The divide by 16 output at pin 5 of binary counter 114, and the divide by 1024 output at pin 14 of binary counter 114, are processed through exclusive or gate 116 and flip-flop 118 to provide a 610.848 KHz signal output at pin 1 of flip-flop 118. Exclusive or gate 116 effectively removes one pulse in each 64 occurring on the divide by 16 (pin 5) output of binary counter 114, resulting in an output frequency to flip-flop 118 of 610.848 KHz. The flip-flop 118 removes transients produced by exclusive or gate 116 that would otherwise be counted as additional pulses. The flip-flop 118 is clocked by the divide by 8 output (pin 6) of binary counter 114.

The data receive and decode circuitry 104 broadly includes high-pass filter 122, low-pass filter 124, comparator 126, data clock recovery circuitry 128, phase-locked-loop 130, and data demodulator 132.

The unfiltered receive audio signal taken from the transceiver 18, 22 or repeater 16, 17 associated with individual data interface units 12 is applied to high-pass filter 122. In particular, the unfiltered audio signal is taken from the output of the detector of the associated transceiver, and comprises a 0-20 KHz bandwidth input to high pass filter 122. It will be recalled that preferred land mobile tuned systems use the subaudio band (0-300 Hz) for transmission or trunk signaling information. High-pass filter 122 attenuates subaudio frequencies (below 300 Hz) to remove any trunk signaling information that may be present. The audio signal is then applied to low-pass filter 124 to attenuate frequencies above 9600 Hz to eliminate noise that could interfere with the data signal. Filtering the audio input to a bandwidth of 300-9600 Hz provides optimal usage of the 25 KHz channel bandwidth (considering the +/−5 KHz allowed deviation), while preventing channel overlap.

Comparator 126 receives the bandwidth filtered audio input signal from the output of low-pass filter 124. Bilevel digital data encoded in the audio signal is converted from its approximate four volt floating AC level to a digital signal having logic levels of approximately eight volts and zero volts. The data signal output of comparator 126 is a bandwidth filtered, Manchester encoded, digital data signal. The output of comparator 126 is fed to data clock recovery circuit 128 for recovery of timing information from the Manchester encoded data signal, and is fed to the data demodulator 132 for comparison with the recovered timing information output of clock recovery circuit 128 to provide a demodulated, NRZ encoded data signal.

The Manchester encoded data signal output of comparator 126 is applied to exclusive or gate 134 of data clock recovery circuit 128. Exclusive or gate 134 is in effect a frequency doubler, generating a short positive-going pulse each time a transition occurs in the Manchester encoded input. The RC network formed by R11 and C8 controls the width of the pulse presented at the output of exclusive or gate 134.

The pulsing output from exclusive or gate 134 is applied to a circuit consisting of and gate 136, binary counters 138, 140, and gate 142. The and gates 136, 142 and binary counters 138, 140 are configured to function as a one-shot multi-vibrator. The operation of the one-shot multi-vibrator is best understood by way of an example. Assume that and gate 136 is initially enabled by a high logic level presented at pin 1. When a positive going pulse is presented to pin 2 of and gate 136, the output of and gate 136 goes high and resets both counters 138, 140. Both inputs to and gate 142 will therefore be low, and the output at pin 4 of and gate 142 will also go low, thereby disabling and gate 136, and enabling counters 138, 140. The binary counters 138, 140 are cascaded together to divide down the 610.848 kHz master clock signal as applied to pin 2 of counter 138. In particular, the divide by 16 output at pin 6 of counter 138 is applied to the enable input (pin 10) of counter 140. Counter 140 has a divide by 8 output at pin 13 and a divide by 4 output at pin 12. When 64 pulses are counted by counters 138, 140, the divide by 8 output at pin 13 of counter 140 goes high. When 96 pulses are counted by counters 138, 140, the divide by 4 output at pin 12 of counter 140 also goes high which causes the output of and gate 142 to go high. The high output level at pin 4 of and gate 142 brings the clk input at pin 1 of counter 138 high, thereby inhibiting further counting. At the same time, pin 1 of and gate 136 is brought high thereby reenabling the and gate 136. The presentation of the next output pulse from comparator 126 to exclusive or gate 134 will therefore cause the above described cycle to repeat.

The process described above for the operation of data clock recovery circuit 128 presents a raw recovered clock signal at the divide by 8 output of counter 140 that is approximately 180° out of phase with the clock signal embedded in the recovered Manchester encoded data signal. Phase-locked-loop 130 filters the data clock signal output of the data clock recovery circuit 128 and produces an output signal which has a 50% duty cycle, and which is phase-locked to the raw clock signal output of the data clock recovery circuit 128.

The phase-locked-loop 130 is similar to the phase-locked-loop circuit described in U.S. Pat. No. 4,733,169 which is incorporated herein by reference. The phase-locked-loop circuit consists of exclusive or gate 144, counters 146, 148, 150, and exclusive or gate 152. Exclusive of gate 144 functions as a phase detector. The input signals at pins 1 and 2 of exclusive or gate 144 must be the same frequency for the phase-locked-loop to be locked. The gate 144 produces output pulses which are equal in duration to the time that the signals input at pins 1 and 2 of the gate 144 are out of phase.

In particular, the output of data clock recovery circuit 128 is presented at pin 1 of exclusive or gate 144 to function as a reference frequency for the phase-locked-loop. The input at pin 2 of exclusive or gate 144 is the phase-locked-loop output. When the two signals presented at pin 1 and pin 2 of exclusive or gate 144 are in phase, the output of the exclusive or gate 144 is low, thereby disabling counters 146, 148. The phase-locked-loop output at pin 4 of binary counter 150 is then simply the 610.848 kHz clock signal divided by 128 (4772 Hz). This is the lowest frequency that the phase-locked-loop can lock on to.

When the inputs to exclusive or gate 144 are out of phase, binary counters 146, 148 are enabled, and the output at pin 2 of binary counter 148 is the 610.848 kHz clock divided by 32 (it being understood from the drawing that binary counters 146, 148 are cascaded together). The output signal at pin 11 of counter 148 is applied to pin 6 of exclusive or gate 152. An additional input pulse to pin 10 of counter 150 can thereby be inserted into the 610.848 kHz clock signal, up to once every 32 clock pulses. The insertion of pulses by exclusive or gate 152 can increase the output frequency at pin 4 of counter 150 such that the reference frequency at pin 1 cf the phase detector exclusive or gate 144 and the output of the phase-locked-loop at pin 4 of binary counter 150 are the same frequency.

At the center frequency of the phase-locked loop, the clock signal output at pin 4 of binary counter 150 is 90° out of phase with the raw clock signal. The 90° phase shift flip-flop 154 provides a 90° phase shift to the clock signal output at pin 4 of counter 150. The output at pin 13 of flip-flop 154 is therefore the recovered data clock signal derived from the clock signal embedded in the Manchester encoded data signal presented at the output of comparator 126.

Data demodulator 132 converts the Manchester encoded data signal presented at the output of comparator 126 into NRZ encoded data. Exclusive or gate 156 operates as the data decoder. The Manchester encoded output signal of comparator 126 is presented at pin 12 of exclusive or gate 156, and the recovered data clock signal is presented at pin 13 of data decoder exclusive or gate 156. The output of the data decoder exclusive or gate 156 is an unfiltered NRZ encoded data signal.

The unfiltered NRZ data signal output from data decoder 156 contains noise and other undesired signals. The circuit consisting of binary counters 158, 160 and flip-flop 162, 154 integrates, samples and then latches the data signal to remove the unwanted noise from the NRZ data signal.

In particular, when the output of the data decoder exclusive or gate 156 is high, counter 158 is enabled so as to begin counting the 610.848 kHz clock. Counters 158 and 160 are cascaded together to provide an overall divide number of 128. If 64 input clock pulses are counted by counters 158, 160 before reset occurs, the output at pin 13 of counter 168 goes high. It will be appreciated that the time in which 64 input pulses occurs is approximately half the duration of a data bit.

At the end of each data interval, the output at pin 12 of flip-flop 154 goes high, and the logic level on pin 13 of counter 160 is latched by flip-flop 162. Counters 158, 160 are also reset by the pulse produced by capacitor C9 charging through resistor R12. It will therefore be appreciated that, if the output of data detector exclusive or gate 156 has been high long enough for 64 or more clock pulses to be counted, a logic one output is produced at pin 2 of flip flop 162. Conversely, if less than 64 pulses are counted by counters 158, 160 during a data interval, a logic zero is produced at pin 2 of flip-flop 162. The output of data demodulator 132 presented at pin 2 of flip-flop 162 is therefore a clean, NRZ encoded data signal recovered from the Manchester encoded data input to the data receiving and decode circuitry 104.

The high-pass and low-pass filters 122, 124 of the data receive and decode circuitry 104 are effectively substituted for the audio filters in the transceiver 18, 22 associated with a data interface unit 12 when the unit 12 is receiving data. The broader band pass of the filters 122, 124 provides for reception of data at higher rates than would be allowed through a transceiver audio fiter. Moreover, the integrate, sample and dump routine performed by the data receive and decode circuitry 104 provides for a clean, properly synchronized data signal.

As described above, data interface unit 12 can be used in conjunction with a central station 22, a repeater 16, 17 or a mobile transceiver 18. When installed in a repeater, the data interface unit 12 merely retransmits data originated at a transmitting station. The data clock embedded in the data at the transmitting station, therefore, must be maintained by the repeater. On the other hand, when the data interface unit 12 is used in conjunction with a transceiver originating a transmission, the data interface unit must originate its own clock signal. In such cases, the 4848 Hz clock signal presented by master clock 102 is used as the data clock. Switch 110 permits configuration of the data interface unit 12 for operation in conjunction with either a repeater 16, 17 or a transceiver 18, 22. In particular, connecting pin 2 and pin 3 of switch 110 presents the recovered data clock signal to the data encode circuitry 108 when the data interface unit 12 is to be used in conjunction with a repeater 16, 17. When the unit 12 is configured for use with a transceiver, pin 1 and pin 2 of switch 110 are connected together so as to provide the 4848 Hz signal from the master cock to the data encode circuitry 108.

Data encode circuitry 108 includes data encoder 164, delay circuitry 168, pulse shaping circuitry 170, amplifier 172, low-pass filter 174, and summing amplifier 176.

Data encoder 164 comprises exclusive or gate 180. Either the recovered data clock signal from data demodulator 132, or the 4848 Hz clock signal from master clock 102, is presented to pin 5 of exclusive or gate 180 depending on the configuration of switch 110 as described above. NRZ encoded data is presented to pin 6 of exclusive or gate 180 from logic unit 106. When unit 12 is being used in conjunction with a repeater, the NRZ encoded data is the data recovered from the initiating transmitter. When unit 12 is being used with a transceiver, the NRZ encoded data is derived from the computer 25 or data terminal 19 via the RS-232 connector 111. The data encoder 164 combines the NRZ encoded data with the selected clock signal to provide a Manchester encoded data signal at pin 4 of gate 180.

Pulse shaping circuitry 170 comprises flip-flops 180, 182 and exclusive or gates 184, 186. Flip-flops 180, 182 provide shaping of the data signals so as to minimize interference with subaudio trunk signaling data. It will be recalled that preferred trunk land mobile vehicle systems use the subaudio band for system signaling. The signaling data is separate and unrelated to informational data handled by the data interface unit 12, and pulse shaping circuitry 170 assists in removing frequency components within the informational data that could be confused for signaling data.

In particular, exclusive or gate 184 functions as a frequency doubler. A pulse of short duration is generated at output pin 3 of gate 184 each time a transition occurs in the clock signal presented at pin 2 of gate 184. The short pulses are inverted by exclusive or gate 186 and presented to the clock inputs of flip-flops 180, 182. The duration of the pulses is controlled by the RC network of R37 and C35. The Q output at pin 1 of flip-flop 182 is tied to the D input at pin 9 of flip-flop 180. The frequency doubler circuit of gates 184, 186 essentially doubles the clock frequency presented to flip-flops 180, 182.

Each half bit of the Manchester encoded data output of data encoder 164, presented at the D input to flip-flop 182, is thereby clocked through the flip-flops 180, 182. Resistor R13 on the output of flip flop 180 effectively subtracts a small portion of the previous half bit from the current Manchester half-bit. The above described action shapes the response of the data signal output of the pulse shaping network 170 to minimize interference with the subaudio trunk radio data signaling.

Delay circuitry 168 delays turn-off of the data encoding circuitry 108 upon the completion of a data transmission, to allow a turn-off dotting pattern to be transmitted following the data transmission. In particular, the logic unit 106 presents a high logic signal to the reset input of flip-flop 182 through the delay circuitry 168 when data is not being transmitted. Flip-flop 182 is thereby disabled preventing the data encode circuitry 108 from presenting an output signal. The RC circuit of resistor R38 and capacitor C36 delays the reset for a short time after the end of a data transmission to allow a turnoff code dotting pattern to be transmitted. When logic unit 106 has subsequent data to be transmitted, a logic low output is presented to the data transmit delay circuitry 168. Diode CR9 bypasses the RC circuitry of resistor R38 and capacitor C36 to override the delay when entering the data transmit mode.

Amplifier 172 provides amplification of the Manchester encoded data signal to provide a desired output level. Potentiometer R15 allows for adjustment of the output level. Low-pass filter 174 attenuates data frequencies above 9,600 Hz, ensuring that the transmitted RF signal does not exceed bandwidth occupation limits.

Summing amplifier 176 combines the Manchester encoded data signal with radio signaling data. As described above, the subaudio baud (0–300 Hz) is employed by preferred trunk radio systems for communicating information regarding channel assignments, recipients of transmission, and other required signaling data. The signaling data is generated within the transceiver, forwarded to the data interface unit 12, and combined with data signals in summing amplifier 176 for transmission when the interface unit 12 is providing Manchester encoded data for transmission.

Logic unit 106 includes microprocessor 180, address latch 182, RAM memory 184, EPROM memory 186, EEPROM memory 188, and reset circuitry 190.

Microprocessor 180 is preferably a CMOS eight bit microprocessor having a serial data port (RxD/TxD) at pins 10 and 11, a 128 byte RAM and four eight-bit I/O ports. The operating speed of the microprocessor is established b/ the 9.9287 MHz clock signal applied to the XTAL input at pin 19 of the processor. The frequency is divided down by internal counters to establish a machine cycle time of 1.21 microseconds. The master clock 310.272 kHz signal provides a timing signal at the microprocessor T1 input (pin 15) for the serial data port (RxD/TxD). The master clock 4848 Hz signal is connected to the INT1 (pin 13) input to establish the baud rate at which data is transmitted when the data interface unit 12 is installed with a transceiver 18, 22. The recovered data clock signal and recovered NRZ encoded data signal provided by data receiving and decoding circuitry 104 are presented at the INT0 (pin 12) and T0 (pin 14) inputs, respectively.

Microprocessor 180 is connected to its associated data terminal 19, 24 via RS-232 connector 111 at Request to Send (RTS) input P1.1 (pin 2), Clear to Send (CTS) output P1.0 (pin 1), and the previously mentioned serial data port (RxD/TxD). The RxD input provides a path for serial data input from the terminal 19, 24 to the data interface unit 12. The TxD output provides a path for serial data out from the data interface unit 12 to the terminal 19, 24. Data can be sent from the terminal 19, 24 in either an interactive mode (wherein data is temporarily stored in RAM buffer memory 182 before transmission), or in a block mode (wherein data is transmitted by the interface unit 12 upon receipt of the data from the terminal 19, 22). The Request to Send (RTS) and Clear to Send (CTS) input and output provide for necessary handshaking between the data interface unit 12 and terminal 19, 22, when operating in the block mode.

The operating program for the data interface unit 12 is stored in EPROM 186. As described above, RAM 184 provides buffer memory when the data interface unit is operated in the interactive mode.

Address latch 182 provides addressing interface between the microprocessor 180, RAM memory 184, and EPROM memory 186. In particular, lines AD0 through AD7 at pins 32-39 of microprocessor 180 are used as an address/data bus for data read and write operations to RAM 184 and EPROM 186. The low order eight bytes of the address are multiplexed with the eight data bytes. The address bytes appear on the bus first and are latched by address latch 182 when the ALE output of the microprocessor 180 goes low. The data being read or written then appears. Lines A8 through A12 at pins 21 through 25 of microprocessor 180 provide the five high order address bytes to RAM 184 and EPROM 186. The $\overline{WR}$ and $\overline{RD}$ outputs are used to write and read data to and from RAM memory 184. The $\overline{PSEN}$ output is used to read data from EPROM 186.

NRZ encoded data is output from microprocessor 180 at output P1.7 (pin 8), and provided to the data encoder circuitry 108 for encoding in Manchester format and subsequent transmission. When the data interface unit is connected to a terminal 19, 24, the NRZ data presented at output P1.7 is from the terminal. When the data interface unit 12 is connected to a repeater 16, 18, the NRZ data presented at output P1.7 is the detected data received by the repeater and input to the microprocessor at input TO (pin 14).

Portions of the operating program for microprocessor 180 are user determined. For instance, the unit 12 can be set up for use with a transceiver 18, 22 or a repeater 16, 17. Data can be processed in either the interactive mode or the block mode. The baud rate, as will be described in detail below, is user selectable. Such user programmable portions of the operating program are stored in EEPROM 188, and are selectable upon initial installation of data interface unit 12, and can be changed at each start up of the unit 12.

Reset circuitry 190 provides a reset signal to the reset (RST) input (pin 9) of microprocessor 180 when power is first applied to the data interface unit 12, and also when the five volt power supply drops below approximately 4.3 volts. Resetting of the microprocessor 180 clears several registers in the microprocessor 180, and starts the operating program from its beginning. The reset circuitry 190, by providing a reset signal to the microprocessor 180, prevents improper operation of the microprocessor 180 during low supply voltage.

Whenever data is being transmitted by the data interface unit 12, a logic low is presented at output P1.3 (pin 4) of microprocessor 180. When the data interface unit 12 is connected to a transceiver 18, 22, the logic low signal mutes the audio output of the transceiver, and inhibits the transceiver from sending voice signals by disabling the transceiver's push to talk (PTT) switch. When the interface unit 12 is receiving data, a logic low signal is presented at output P1.2 (pin 3) of microprocessor 180, muting the receive audio on the transceiver 18, 22 so that the receive data is not heard from the speaker of the transceiver. Input P1.4 (pin 5) of microprocessor 180 coordinates data transmissions from the data interface unit 12 with voice transmissions from the transceiver 18, 22. In particular, the data interface unit 12 is inhibited from sending data by a signal presented at the P1.4 input when the transceiver is being used for voice communications. Input P1.5 (pin 6) of microprocessor 180 is used to indicate to the data interface unit 12 when a mobile transceiver 18 is out of range of a repeater 16, 17. Input P1.5 is also used to indicate to microprocessor 180 when the transceiver squelch has been enabled. It will be understood that the transceiver squelch is enabled when the transceiver 18, 22 has received a signal addressed to it. Providing the interface unit 12 with the squelch/unsquelched information enables the data interface unit 12 to know when it should start to look for a data signal.

Data interface unit 12 transmits data at 4848 baud, as described above. Alternatively, data can be transmitted by the unit 12 at a lower baud rate (such as 1200 baud), in a redundant mode. In particular, and referring to FIG. 3, data bits are transmitted serially in, for instance, 99 bit blocks. Each block 200 of data bits is followed immediately by two repetitions of the identical block 200', and 200", both repetitions being in complemented form. Each bit (bit n) in each of the three blocks is compared to the equivalent bit (bit n) in the other blocks. A two out of three majority vote is taken to determine the actual value of the bit.

Figure 3:
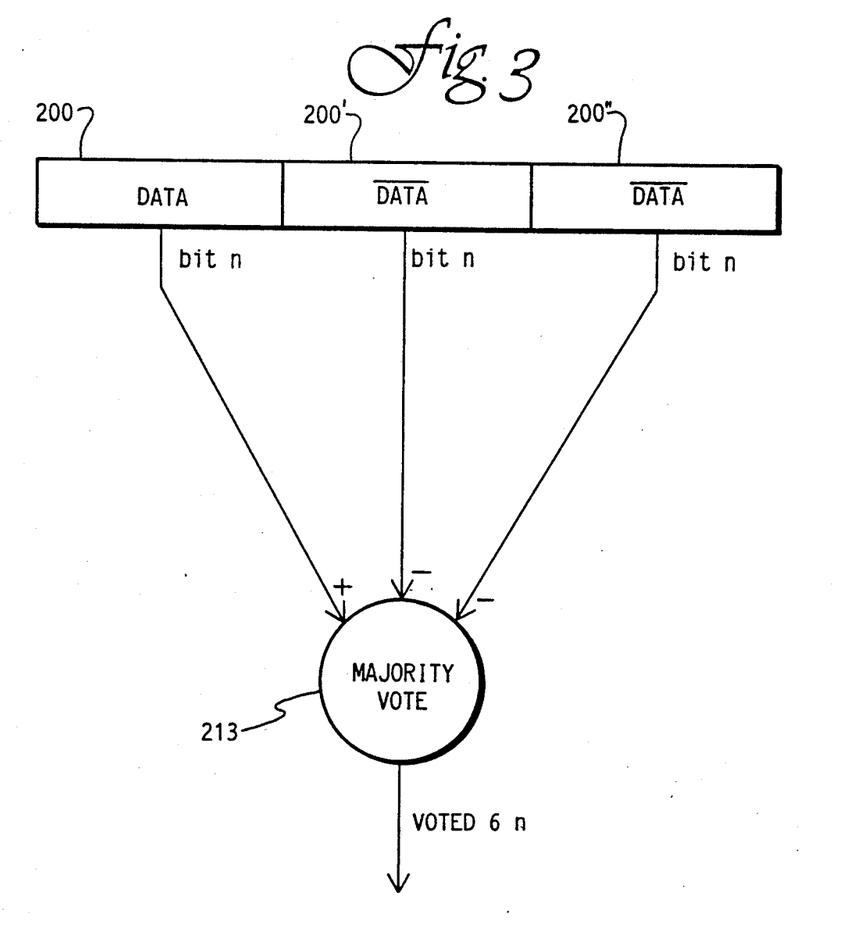
FIG. 3 is a schematic diagram depicting a scheme for redundant mode transmission of data.

It is essential that the two repetitions 200', 200", of the block 200 be presented in complemented form. It will be understood that, because the data is sent serially, the three blocks of data arrive at separate times. Sending the first block in uncomplemented form, and the two repeat blocks in complemented form, prevents the possibility of the two out of three majority vote seeing synch until all three blocks have come in. Sending data in a two out of three majority vote redundant mode provides a high degree of protection against fading, since the three bits that are voted on are separated in time, and are unlikely to all be affected by the same fade.

Those skilled in the art will appreciate that, in conventional trunked land mobile radio systems, an end of transmit signal is sent at the end of each transmission. The end of transmit signal releases the repeater engaged for the transmission so as to be available for a subsequent transmission by the same or another user of the system. In the same regard, the beginning of a transmission must include signaling data to acquire a repeater and identify the recipient of the transmission. Engagement and release of a repeater at the beginning and end of each transmission takes a discernable time. It will also be appreciated that land mobile radio systems typically provide half duplex operation, meaning that signals can both be received and transmitted, but not at the same time. Accordingly, receipt acknowledgment of data in a conventional trunked land mobile radio system would require repeater release and engagement each time acknowledgment was required, drastically increasing the time to make a complete data transmission.

Receipt acknowledgment in the present invention is accomplished in a manner that overcomes the above described time delay problem. In particular, when operated in a receipt acknowledgment mode, the data interface unit 12 will send a receipt acknowledgment command at periodic intervals to the addressee of the transmission. The data interface unit 12 connected to the receiving addressee will then momentarily reconfigure its transceiver 18, 22 to transmit an acknowledgment, and, at the same time, the data interface unit 12 connected to the station transmitting the communication will momentarily reconfigure its transceiver 18, 22 to receive the acknowledgment. Because of the short time in which the two transceivers switch transmitting and receiving roles for the receipt acknowledgment, the repeater need not be released, and no release or engagement signal is sent to the repeater. In this manner, it will be appreciated, receipt acknowledgment is accomplished by the data interface unit 12 in accordance with the present invention without introducing an unacceptable time delay.

We claim:

1. A data interface unit for interfacing a data terminal or the like with a transceiver for a voice radio communications system, said transceiver including a detector presenting an unfiltered audio signal, said audio signal having a received clock encoded data signal modulated thereon, said interface unit being adapted for receiving said unfiltered audio signal from said transceiver and for coupling to said transceiver for modulation of signals within said transceiver with a transmitted clock encoded data signal, comprising:

input means adapted for coupling to said transceiver detector for monitoring of said unfiltered audio signal, said input means including filter means for presenting said unfiltered audio signal as a bandwidth limited information signal;

signal demodulator means operably coupled to said filter means for demodulating said bandwidth limited information signal to present said received clock encoded data signal;

clock recovery means operably coupled to said signal demodulator means for recovering received clock information from said received clock encoded data signal;

data demodulating means operably coupled to said signal demodulator means and said clock recovery means for recovering received data signals from said received clock encoded data signal;

logic means operably coupling said data demodulating means with said data terminal for presentation of said received data signals to said data terminal and for receiving outgoing data signals from said data terminal;

encoding means operably coupled to said logic means for encoding said outgoing data signals with timing information to present said transmitted clock encoded data signal; and coupling means operably coupled to said encoding means for presenting said transmitted clock encoded data signal to said transceiver.

2. The invention as claimed in claim 1, including clock means for generating an onboard clock signal, and adapter means operably coupling said encoding means, said clock means and said clock recovery means for selectively presenting said encoding means with said timing information from either said clock recovery means or said clock means.

3. The invention as claimed in claim 1, said voice radio communications system comprising a trunked radio system having a plurality of mobile transceivers operating on a plurality of transmission channels, the operation of said trunked radio system requiring the transmission of signalling information to coordinate the assignment of said mobile transceivers to said channels, said coupling means including summing means for combining said signalling information with said transmitted clock encoded data signal.

4. The invention as claimed in claim 3, said signalling information occupying a first frequency band, and said transmitted clock encoded data signal occupying a second frequency band, said interface unit including pulse shaping means operably coupled to said encoding means for removing frequency components within said first frequency band from said transmitted clock encoded data signal.

5. The invention as claimed in claim 4, said clock information having a clock frequency, said pulse shaping means including frequency doubling means for presenting a doubled clock frequency and flip-flop means for operably gating each half bit of said transmitted clock encoded data signal to said coupling means in accordance with said doubled clock frequency.

6. The invention as claimed in claim 5, including means operably coupled to said flip-flop means for subtracting a portion of each of said half bits from the next succeeding half bit.

7. The invention as claimed in claim 1, said logic means selectively coupling said data demodulating means and said encoding means for reencoding of said received data signals whereby said received clock encoded data signal is reformed for retransmission by said transceiver.

8. The invention as claimed in claim 1, said data demodulating means including means for performing an integrate, sample, and dump routine.

* * * * *

UNITED STATES PATENT AND TRADEMARK OFFICE
CERTIFICATE OF CORRECTION

PATENT NO. : 5,212,714

DATED : May 18, 1993

INVENTOR(S) : Mervin L. Grindahl et al.

It is certified that error appears in the above-identified patent and that said Letters Patent is hereby corrected as shown below:

Column 4, line 26, delete the word "or" and substitute therefor -- of --.

Column 6, line 58, delete the word "fiter" and substitute therefor -- filter --.

Column 8, line 23, delete the word "baud" and substitute therefor -- band --.

Signed and Sealed this

Eleventh Day of January, 1994

Attest:

BRUCE LEHMAN

Attesting Officer

Commissioner of Patents and Trademarks